(12) United States Patent
Ma et al.

(10) Patent No.: US 8,279,791 B2
(45) Date of Patent: Oct. 2, 2012

(54) CONFIGURATION AND INDICATION METHODS OF MULTICAST/BROADCAST OVER A SINGLE FREQUENCY NETWORK FRAMES AND AN IDENTIFYING METHOD USED BY A TERMINAL

(75) Inventors: Zijiang Ma, Shenzhen (CN); Zhifeng Ma, Shenzhen (CN); Bin Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 127 days.

(21) Appl. No.: 12/937,275

(22) PCT Filed: Mar. 12, 2009

(86) PCT No.: PCT/CN2009/070763
§ 371 (c)(1),
(2), (4) Date: Oct. 11, 2010

(87) PCT Pub. No.: WO2009/111988
PCT Pub. Date: Sep. 17, 2009

(65) Prior Publication Data
US 2011/0103251 A1    May 5, 2011

(30) Foreign Application Priority Data

Mar. 14, 2008   (CN) .......................... 2008 1 0083394

(51) Int. Cl.
*H04H 20/72* (2008.01)
(52) U.S. Cl. ..... 370/312; 370/252; 370/270; 370/310.2; 370/328; 370/339; 370/349; 370/390; 370/432; 455/422.1
(58) Field of Classification Search ................. 370/252, 370/270, 310.2, 312, 328–339, 349, 390, 370/432; 455/422.1
See application file for complete search history.

(56) References Cited

U.S. PATENT DOCUMENTS

| | | | |
|---|---|---|---|
| 2002/0004398 A1* | 1/2002 | Ogino et al. | 455/456 |
| 2005/0249140 A1 | 11/2005 | Lee et al. | |
| 2005/0249141 A1 | 11/2005 | Lee et al. | |
| 2005/0272459 A1 | 12/2005 | Lee et al. | |
| 2008/0232395 A1* | 9/2008 | Buckley et al. | 370/465 |
| 2009/0252077 A1* | 10/2009 | Khandekar et al. | 370/312 |

(Continued)

FOREIGN PATENT DOCUMENTS

CN        1943145 A        4/2007

(Continued)

OTHER PUBLICATIONS

Lee et al., IEEE C802.16m-08/089, IEEE 802.16 Broadband Wireless Access Working Group, Jan. 16, 2008, IEEE.*

(Continued)

*Primary Examiner* — Hoon J Chung
(74) *Attorney, Agent, or Firm* — Oppedahl Patent Law Firm LLC

(57) ABSTRACT

A configuration method and an indication method of MBSFN frames and an identifying method used by a terminal applied in a long term evolution system are disclosed in the present invention, which include: an access network sends configuration parameters of the MBSFN frame to a mobile terminal determining whether the wireless frame received is an MBSFN frame according to the configuration parameters, the configuration parameters including a repetition period of the MBSFN frames distributed in system-set time. With the present invention, it could consume less bytes in system message to complete the configuration of the MBSFN sub-frames and could save system resources.

8 Claims, 2 Drawing Sheets

U.S. PATENT DOCUMENTS

| | | | | |
|---|---|---|---|---|
| 2009/0304024 | A1* | 12/2009 | Jou et al. | 370/465 |
| 2010/0080166 | A1* | 4/2010 | Palanki et al. | 370/315 |
| 2010/0110964 | A1* | 5/2010 | Love et al. | 370/312 |
| 2010/0135272 | A1* | 6/2010 | Dayal et al. | 370/343 |
| 2010/0226268 | A1* | 9/2010 | Tao et al. | 370/252 |
| 2010/0315963 | A1* | 12/2010 | Jading et al. | 370/252 |
| 2011/0194523 | A1* | 8/2011 | Chung et al. | 370/329 |
| 2011/0211522 | A1* | 9/2011 | Chung et al. | 370/315 |
| 2011/0222411 | A1* | 9/2011 | Koskinen et al. | 370/241 |
| 2011/0267997 | A1* | 11/2011 | Seo et al. | 370/280 |
| 2011/0292825 | A1* | 12/2011 | Lee et al. | 370/252 |
| 2012/0039232 | A1* | 2/2012 | Kwon et al. | 370/312 |

FOREIGN PATENT DOCUMENTS

| | | |
|---|---|---|
| CN | 101043696 A | 9/2007 |
| CN | 101047438 A | 10/2007 |

OTHER PUBLICATIONS

Huawei, MBSFN Subframe Allocation Signaling, 3GPP TSG-RAN-WG1 Meeting #51bis, Sevilla, Spain, Jan. 14-Jan. 18, 2008, R1-080119.*

Alcatel-Lucent, 3GPP TSG-RAN WG1 #51bis, Sevilla, Jan. 14-18, 2008, R1-080210.*

Huawei, 3GPP TSG-RAN-WG2 Meeting #61, Sorrento, Italy, Feb. 11-Feb. 15, 2008, R2-080839.*

Panasonic, MBMS scheduling information and paging occasion relating to MBSFN subframe allocation, 3GPP TSG RAN WG2 #61, Feb. 11-14, Sorrento, Italy, R2-080875.*

Alcatel-Lucent, Constraints on signalling of MBSFN subframe allocations, 3GPP TSG-RAN2#61, Feb. 11-Feb. 15, 2008, R2-080982.*

3GPP TS 36.211 v8.1.0 (Nov. 2007), 3rd Generation Partnership Project, Technical Specification Group Radio Access Network, Evolved Universal Terrestrial Radio Access (E-UTRA), Physical Channels and Modulation (Release 8), Nov. 2007.*

3GPP TS 36.300 v8.3.0 (Dec. 2012), 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2 (Release 8), Dec. 2007.*

3GPP TS 36.331 v8.0.0 (Dec. 2007), 3rd Generation Partnership Project, Technical Specification Group Radio Access Network, Evolved Universal Terrestrial Radio Access (E-UTRA), Radio Resource Control (RRC), Protocol specification (Release 8), Dec. 2007.*

English Translation of the Written Opinion of the International Search Authority in international application No. PCT/CN2009/070763, mailed on Jun. 18, 2009.

International Search Report on international application No. PCT/CN2009/070763, mailed on Jun. 18, 2009.

* cited by examiner

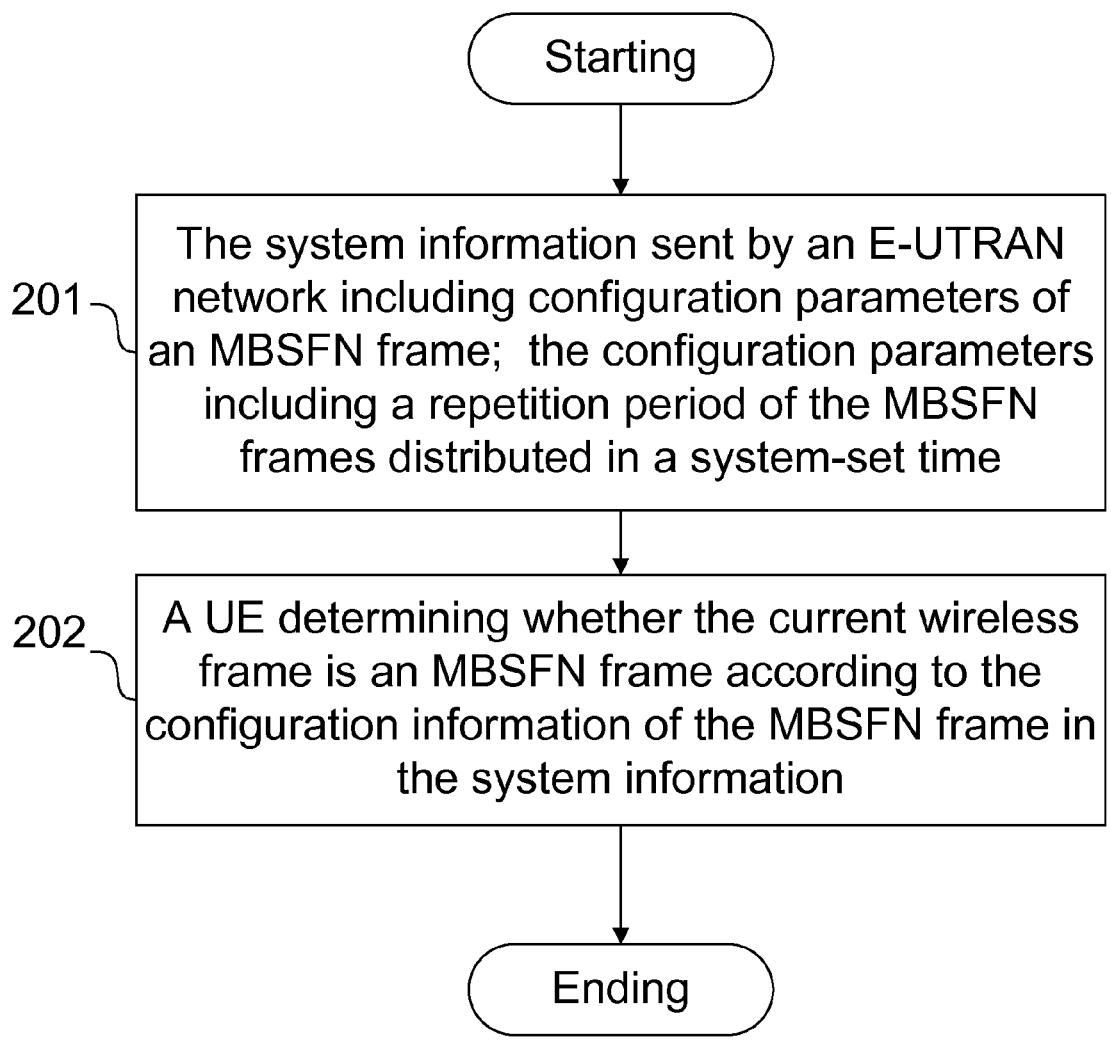

CONFIGURATION AND INDICATION METHODS OF MULTICAST/BROADCAST OVER A SINGLE FREQUENCY NETWORK FRAMES AND AN IDENTIFYING METHOD USED BY A TERMINAL

TECHNICAL FIELD

The present invention relates to the field of wireless communications, and in particular to a configuration method and an indication method of multicast/broadcast over a single frequency network (MBSFN) frames in a long term evolution (LTE) system and an identifying method used by a terminal.

BACKGROUND

In 2005, the $3^{rd}$ generation partnership project (3GPP) initiated an LTE research working group to research and design the next generation network of the 3.9 G (evolved 3 G) evolved from the $3^{rd}$ generation mobile communication technology, with the overall design target of a concise system structure, a higher transmission speed, a low comprehensive cost, economical and excellent backward compatibility, flexible utilization of frequency spectrum and flexible service support capacity.

In order to utilize resources of a mobile network efficiently, the 3GPP puts forward a multimedia broadcast multicast service (MBMS) to provide a point-to-multipoint data service that a data source sends data to a plurality of users in a mobile network, thereby realizing the share of network resources and improving the utilization rate of network resources, especially, precious air interface resources. The MBMS is a technology for transmitting a shared network resources from a data source to a plurality of targets, the MBMS defined by the 3GPP can realize not only the multicast and the broadcast of a full-text message at a low speed but also the multicast and the broadcast of a multimedia service at a high speed, so a plenty of video, audio and multimedia services are provided. In an LTE network, the MBMS technology is known as an evolved MBMS (E-MBMS).

As illustrated in FIG. 1, in a frequency division duplex (FDD) mode and a time division duplex (TDD) mode of an LTE system, wireless frames are divided into MBSFN frames (the frames in FIG. 1 filled by grids) and non-MBSFN frames i.e. unicast frames (the blank frames in FIG. 1); part subframes of the MBSFN frames adopt MBSFN transmission mode, namely, the sub-frames in each MBSFN frame are further divided into MBSFN sub-frames (the sub-frames in FIG. 1 filled by oblique lines) and non-MBSFN sub-frames, i.e. unicast sub-frames (the sub-frames in FIG. 1 filled by dots), and all the sub-frames in a non-MBSFN frame adopt an unicast transmission mode instead of the MBSFN transmission mode.

In order to improve the resources utilization rate of the E-MBMS, a carrier frequency may support one or more MBMS transport channels (MCHs), in this case this specific MCH-distributed physical resource may adopt a specific pattern of sub-frames, which is known as an MCH sub-frame allocation pattern (MSAP). A plurality of MBMS services may be mapped to the same MCH, and the MBMS services included by the MCH belong to the same MBSFN area.

In the MBSFN transmission mode, the reference signals inserted in an MBSFN sub-frame rather than common cell-specific reference signals are adopted for a signal estimation, the adopted reference signals employ the MBSFN transmission mode, that is, all the cells participating in the MBSFN mode adopt the identical reference signals, which are known as MBSFN reference signals; and in a wireless frame, MBSFN sub-frames employ the MBSFN reference signals.

In an LTE network employing FDD or TDD, it is needed for a mobile terminal to know whether each wireless frame is an MBSFN frame and whether each sub-frame in each MBSFN frame employs the MBSFN, that is, a UE needs to know whether or not each sub-frame is an MBSFN sub-frame, so that the mobile terminal can perform a channel estimation on each sub-frame by adopting the MBSFN reference signals or the cell-specific reference signals. Therefore, evolved universal terrestrial radio access network (E-UTRAN) needs to inform the mobile terminal of the foregoing information of each wireless frame and each sub-frame via a system broadcast message, and the mobile terminal needs to know whether each wireless frame is an MBSFN frame and whether each sub-frame is an MBSFN sub-frame so as to perform a channel estimation on each sub-frame.

The prior art has not yet provided a method for configuring multicast/broadcast over a single frequency network frame in a system-resources-saved manner.

SUMMARY

The present invention aims to provide a configuration method and an indication method of MBSFN frames and an identifying method used by a terminal capable of saving system wireless resources.

In the configuration of MBSFN frames, if a bitmap mode is adopted, in which one bit represents a wireless frame being an MBSFN frame or a non-MBSFN frame, and if M wireless frames are included in a system message broadcast period, then M bits are required for representing the configuration of MBSFN frames, resulting in the occupation of more bytes in a system message and the waste of system resources.

In order to solve the problems above, the present invention provides a configuration method of MBSFN frames, applied in a long term evolution system, wherein an access network sends configuration parameters of an MBSFN frame to a mobile terminal, and the mobile terminal determines whether the wireless frame received is MBSFN frames according to the configuration parameters, and the configuration parameters include a repetition period of the MBSFN frames distributed in a system-set time.

Further the method also includes the following feature: the configuration parameters further include an offset; when determining whether the wireless frame received is an MBSFN frame, the mobile terminal determines the wireless frame received as an MBSFN frame if the remainder resulting from the sequence number of the wireless frame in a broadcast period of system information modulo the repetition period of the MBSFN frames is the offset, otherwise, the mobile terminal determines the wireless frame as not an MBSFN frame.

Further the method also includes the following feature: the repetition period included in the configuration parameters is the distribution period of an MBSFN frame in a broadcast period of system information; when determining whether the wireless frame received is an MBSFN frame, the mobile terminal determines the wireless frame received as an MBSFN frame if the remainder resulting from the sequence number of the wireless frame in the broadcast period of the system information modulo the repetition period of the MBSFN frames is 0, otherwise, the mobile terminal determines the wireless frame as not an MBSFN frame.

Further the method also includes the following feature: configuration parameters further include a continuous distribution number; when determining whether the wireless frame received is an MBSFN frame, the mobile terminal determines the wireless frame received as an MBSFN frame if the remainder resulting from the sequence number of the wireless frame in the broadcast period of the system information modulo the repetition period of the MBSFN frames is an arbitrary value in the range from 0 to the continuous distribution number of the MBSFN frames, otherwise, the mobile terminal determines the wireless frame as not an MBSFN frame.

Further the method also includes the following feature:

the configuration parameters further include a continuous distribution number and an offset of the MBSFN frames; when determining whether the wireless frame received is an MBSFN frame, the mobile terminal determines the wireless frame received as ab MBSFN frame if the remainder resulting from the sequence number of the wireless frame in the broadcast period of the system information modulo the repetition period of the MBSFN frames is the sum of an arbitrary value in the range from 0 to the continuous distribution number of the MBSFN frames and the offset, otherwise, the mobile terminal determines the wireless frame as not an MBSFN frame.

Further the method also includes the following feature:

the configuration parameters include configuration parameters of an MBSFN sub-frame, which occupy M bits, each bit correspondingly representing whether a sub-frame in the MBSFN frame is an MBSFN sub-frame, wherein M is the number of the sub-frames in the MBSFN frame.

Further the method also includes the following feature:

the numbers of the bits occupied by a repetition period, a continuous distribution number and an offset of the MBSFN frames are all the value of $\log_2^k$, wherein K is the number of the wireless frames included in the broadcast period of the system information and has a value equal to an integral power of 2.

In order to solve the problems above, the present invention further provides an indication method of MBSFN frames, including: an access network takes a repetition period and an offset of a multicast/broadcast over a single frequency network frame, namely, an MBSFN frame, as configuration parameters for indicating whether a wireless frame is an MBSFN frame; when sending the mobile terminal the configuration parameters for indicating whether a wireless frame is an MBSFN frame, the access network takes the repetition period as a necessary parameter and the offset as an optional parameter and only sends the optional parameter when the value thereof is not 0.

Further the method also includes the following feature:

the repetition period is smaller than or equal to a broadcast period of system information, and configuration parameters of the repetition period and the offset are both represented by $\log_2^k$ bits, wherein K is the number of the wireless frames included in the broadcast period of the system information.

In order to solve the problems above, the present invention further provides a method for a mobile terminal to identify MBSFN frames, including: a mobile terminal receives the configuration parameters sent by an access network for indicating whether a wireless frame is a multicast/broadcast over a single frequency network frame, namely, an MBSFN frame, and determines the wireless frame meeting the following formula as an MBSFN frame: SFN mod MBSFN_rep=MBSFN_offset, wherein MBSFN_rep is the value of the repetition period included in the configuration parameters; MBSFN_offset is an offset read from the configuration parameters, or is set to be 0 if no offset information is contained in the configuration parameters; "SFN" is the sequence number of the wireless frame, and "mod" represents the modulo operation.

Further the method also includes the following feature:

the access network takes a repetition period and an offset of a multicast/broadcast over a single frequency network frame, namely, an MBSFN frame, as configuration parameters for indicating whether a wireless frame is an MBSFN frame; and when sending the mobile terminal the configuration parameters for indicating whether a wireless frame is an MBSFN frame, the access network takes the repetition period as a necessary parameter and the offset as an optional parameter and only sends the optional parameter when the value thereof is not 0.

Further the method also includes the following feature:

the repetition period is smaller than or equal to a broadcast period of system information, and configuration parameters of the repetition period and the offset are both represented by $\log_2^k$ bits, wherein K is the number of the wireless frames included in the broadcast period of the system information.

In order the solve the problems above, the present invention also provides a mobile terminal including a signal receiving module and MBSFN frame determining module; the signal receiving module is used for receiving the configuration parameters sent by an access network for indicating whether a wireless frame is a multicast/broadcast over a single frequency network frame, namely, an MBSFN frame, the configuration parameters including the value MBSFN_rep of a repetition period and the value MBSFN_offset of an offset, or only including the value MBSFN_rep of a repetition period; and the MBSFN frames determining module is used for determining the wireless frame meeting the following formula as an MBSFN frame: SFN mod MBSFN_rep=MBSFN_offset, wherein MBSFN_offset is 0 when no offset information is included in the configuration parameters, "SFN" is the sequence number of the wireless frame, and "mod" represents the modulo operation.

In order the solve the problems above, the present invention also provides an MBSFN frame indicating system including a mobile terminal, wherein the access network of the system includes an MBSFN frame indicating module; the mobile terminal includes a signal receiving module and an MBSFN frame determining module; the MBSFN frame indicating module is used for sending a repletion period and an offset of a multicast/broadcast over a single frequency network frame, namely, an MBSFN frame, to the mobile terminal as configuration parameters for indicating whether a wireless frame is an MBSFN frame, wherein the repletion period is taken as a necessary parameter and the offset an optional parameter, and the optional parameter is only sent when the value thereof is not 0; the signal receiving module is used for receiving the configuration parameters sent by the access network for indicating whether a wireless frame is a multicast/broadcast over a single frequency network frame, namely, an MBSFN frame; the configuration parameters including the value MBSFN_rep of the repetition period and the value MBSFN_offset of the offset, or only including the value MBSFN_rep of the repetition period; and the MBSFN frames determining module is used for determining the wireless frame meeting the following formula as an MBSFN frame: SFN mod MBSFN_rep=MBSFN_offset, wherein MBSFN_offset is 0 when no is offset information is included in the configuration parameters, "SFN" is the sequence number of the wireless frame, and "mod" represents the modulo operation.

With the present invention, less bytes in a system message are occupied to complete the configuration of MBSFN sub-frame, and system resources is saved.

BRIEF DESCRIPTION OF THE DRAWINGS

FIG. 2 is a diagram of a configuration method for MBSFN frames in an embodiment.

PREFERRED IMPLEMENTATION OF THE INVENTION

Figure 1:
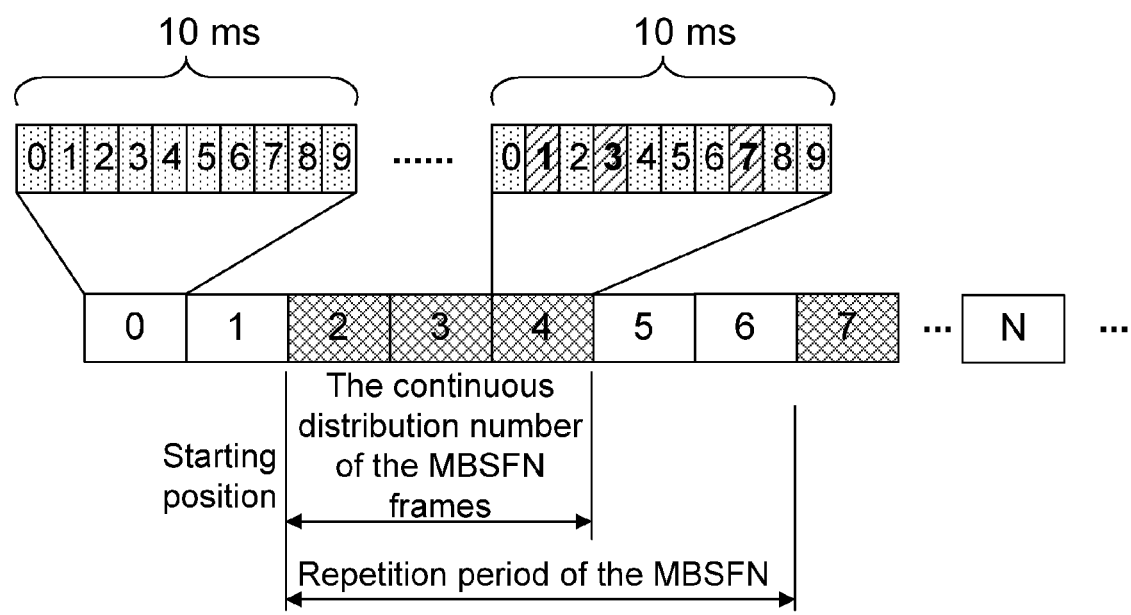
FIG. 1 is a diagram of the configuration of an MBSFN frame in an embodiment.

In an FDD or TDD system of a long term evolution system, as illustrated in FIG. 2, a configuration method for MBSFN frames comprises the following steps:

Step 201, the system information sent by an E-UTRAN includes configuration parameters of an MBSFN frame; the configuration parameters including a repetition period of MBSFN frames distributed in a system-set time.

The configuration parameters for representing MBSFN frames accord with one of the following configuration modes:

(1) the configuration parameters include a repetition period, wherein the number of the bits occupied by the repetition period is valued as $\log_2^k$ if $\log_2^k$ is an integer;

(2) the configuration parameters include a repetition period and a continuous distribution number, which both occupy $\log_2^k$ bits; (an offset is defined as the offset between the first MBSFN frame and the first wireless frame in the repetition period, and the continuous distribution number is defined as the number of the MBSFN frames in the repetition period);

(3) the configuration parameters include a repetition period and an offset, which both occupy $\log_2^k$ bits;

(4) the configuration parameters include a repetition period, a continuous distribution number and an offset, which all occupy $\log_2^k$ bits.

The foregoing K is the number of the wireless frames included in a broadcast period of system information, which is valued as 8, 16, 32 and other values equal to an integral power of 2, the repetition period is smaller than or equal to the broadcast period of system information.

Each MBSFN frame includes a plurality of MBSFN sub-frames that are configured in the same way; the configuration of the MBSFN sub-frames may adopt the bitmap mode, in which one bit represents a sub-frame being an MBSFN sub-frame or a non-MBSFN sub-frame;

In addition to the configuration parameters for representing MBSFN frames, configuration parameters may be included for representing MBSFN sub-frames, which occupy M bits (M is the number of sub-frames in an MBSFN frame), may be included, each bit correspondingly representing whether a sub-frame in the MBSFN frame is an MBSFN sub-frame. The repetition period of the MBSFN frames may be the same as a broadcast period of the system information or be another value set by the system.

The message in system information including the configuration parameters may be: a system information message 1 (SI-1), a system information message 2 (SI-2) and a system information message 3 (SI-3).

Step 202, a mobile terminal determines whether the current frame received is an MBSFN frame according to the configuration information of an MBSFN frame in the system information.

The way of determining is as follows: the mobile terminal determines the current wireless frame as an MBSFN frame if the SFN sequence number of the current wireless frame meets the following formula, and the UE determines the current wireless frame as a non-MBSFN frame if the SFN sequence number of the current wireless frame does not meet the following formula:

SFN mod MBSFN_rep=MBSFN_offset+(an arbitrary value in the range from 0 to MBSFN_length-1)

wherein, MBSFN_rep is the repetition period of the MBSFN frames in the configuration information;

MBSFN_offset is the offset of the MBSFN frame in the configuration information;

MBSFN_length is the continuous distribution number of the MBSFN frame in the configuration frame;

"SFN" is the sequence number of the wireless frame;

"mod" represents the reminder resulting from the "SFN" modulo MBSFN_rep.

In accordance with the mode (1), the configuration parameters only include a repetition period, it is defaulted that the continuous distribution number MBSFN_length and the offset MBSFN_offset are 0, that is, the formula (1) is as follows:

SFN mod MBSFN_rep=0;

when determining whether the wireless frame received is an MBSFN frame, the mobile terminal determines the wireless frame as an MBSFN frame if the remainder resulting from the sequence number of the wireless frame in the broadcast period of the system information modulo the repetition period of the MBSFN frames is 0, otherwise, the mobile terminal determines the wireless frame as not an MBSFN frame.

In accordance with the mode (2), the configuration parameters only include a repetition period and a continuous distribution number, it is defaulted that the offset MBSFN_offset is 0, that is, the formula (1) is as follows:

SFN mod MBSFN_rep=(an arbitrary value in the range from 0 to MBSFN_length-1);

when determining whether the wireless frame received is an MBSFN frame, the mobile terminal determines the wireless frame received as an MBSFN frame if the remainder resulting from the sequence number of the wireless frame in the broadcast period of the system information modulo the repetition period of the MBSFN frames is an arbitrary value in the range from 0 to the continuous distribution number of the MBSFN frames, otherwise, the mobile terminal determines the wireless frame as not an MBSFN frame.

In accordance with the mode (3), the configuration parameters only include a repetition period and an offset, it is defaulted that the continuous distribution number MBSFN_length is 0, that is, the formula (1) is as follows:

SFN mod MBSFN_rep=MBSFN_offset;

when determining whether the wireless frame received is an MBSFN frame, the mobile terminal determines the wireless frame received as an MBSFN frame if the remainder resulting from the sequence number of the wireless frame in the broadcast period of the system information modulo the repetition period of the MBSFN frames is the offset, otherwise, the mobile terminal determines the wireless frame as not an MBSFN frame.

In accordance with the mode (4), the configuration parameters include a repetition period, an offset and a continuous distribution number, when determining whether the wireless frame received is an MBSFN frame, the mobile terminal determines the wireless frame received is an MBSFN frame if the remainder resulting from the sequence number of the wireless frame in the broadcast period of the system information modulo the repetition period of the MBSFN frames is the sum of an arbitrary value in the range from 0 to the continuous distribution number of the MBSFN frames and the offset, otherwise, the mobile terminal determines the wireless frame as not an MBSFN frame.

Embodiment 1

When the number of the wireless frames included in a broadcast period of system information is 32, configuration parameters include a repetition period (the maximum value of the repetition period is 32) and an offset, which are respectively represented by $5(\log_2{}^{32})$ bits (as the maximum values of the repetition period and the offset are both 32, 5 bits is enough for the representation), and the representation refers to the following table:

| Repetition period/Offset | Bit 1 | Bit 2 | Bit 3 | Bit 4 | Bit 5 |
|---|---|---|---|---|---|

If the repetition period (MBSFN_rep) is 5 and the offset (MBSFN_offset) is 2, then according to the formula (1), the SFN sequence number of an MBSFN frame is 2, 7, 12, 17, 22 and 27 in a wireless frame sequence of a broadcast period of system information.

Embodiment 2

When the number of the wireless frames included in a broadcast period of system information is 32, configuration parameters include a repetition period (the maximum value of the repetition period is 32), a continuous distribution number and an offset, which are respectively represented by $5(\log_2{}^{32})$ bits (as the maximum values of the repetition period, the continuous distribution number and the offset are all 32, 5 bits is enough for the representation), and the representation refers to the following table:

| Repetition period/<br>Continuous distribution<br>number/Offset | Bit 1 | Bit 2 | Bit 3 | Bit 4 | Bit 5 |
|---|---|---|---|---|---|

If the repetition period (MBSFN_rep) is 5, the continuous distribution number (MBSFN_length) is 3 and the offset (MBSFN_offset) is 2, then according to the formula (1), the SFN sequence number of an MBSFN frame is 2, 3, 4, 7, 8, 9, 12, 13, 14, 17, 18, 19, 22, 23, 24, 27, 28 and 29 in a wireless frame sequence of a broadcast period of system information.

As mentioned above, in the case that the number of the wireless frames included in the broadcast period of the system information is 32, if the configuration parameters only include a repetition period, 5 bits is enough for the configuration of a multicast/broadcast wireless frame in a repetition period; if the configuration parameters include a repetition period and a continuous distribution number or include a repetition period and an offset only, 10 bits is enough for the configuration of a multicast/broadcast wireless frame in a repetition period; and if the configuration parameters include a repetition period, a continuous distribution number and an offset, 15 bits is enough for the configuration of a multicast/broadcast wireless frame in a repetition period, so the distribution of the MBSFN frames and non-MBSFN frames in the broadcast period of the system information is represented with the use of less bits, and system resources is saved.

In an MBSFN frame indicating system corresponding to the method, the access network includes an MBSFN frame indicating module for sending a repletion period and an offset of a multicast/broadcast over a single frequency network frame, namely, an MBSFN frame, to a mobile terminal as configuration parameters for indicating whether a wireless frame is an MBSFN frame, wherein the repletion period is taken as a necessary parameter and the offset an optional parameter, and the optional parameter is only sent when the value thereof is not 0.

A mobile terminal corresponding to the method includes a signal receiving module and an MBSFN frame determining module.

The signal receiving module receives the configuration parameters sent by the access network for indicating whether a wireless frame is a multicast/broadcast over a single frequency network frame, namely, an MBSFN frame, the configuration parameters including the value MBSFN_rep of the repetition period and the value MBSFN_offset of the offset, or only including the value MBSFN_rep of the repetition period;

The MBSFN frame determining module determines the wireless frame meeting the following formula is an MBSFN frame: SFN mod MBSFN_rep=MBSFN_offset, wherein MBSFN_offset is 0 when no offset information is included in the configuration parameters, "SFN" is the sequence number of the wireless frame, and "mod" represents the modulo operation.

The present invention may have numbers of other embodiments, various modifications and variations can be devised by those skilled in the art without departing from the spirit and scope of the principles of this invention, and that it should be understood the devised modification and variations belong to the protection scope of the claims disclosed therein.

Industrial Applicability

With the present invention, less bytes in a system message are consumed to complete the configuration of an MBSFN sub-frame, and system resources are saved.

The invention claimed is:

1. A configuration method of Multicast/Broadcast over a Single Frequency Network (MBSFN) frames, applied in a Long Term Evolution (LTE) system, including:
   an access network sending configuration parameters of an MBSFN frame to a mobile terminal, and the mobile terminal determining whether a wireless frame received is the MBSFN frame according to the configuration parameters, and the configuration parameters including a repetition period of the MBSFN frames distributed in a system-set time,
   wherein the configuration parameters further include an offset;
   when determining whether the wireless frame received is the MBSFN frame, the mobile terminal determines the wireless frame received as the MBSFN frame if the remainder resulting from the sequence number of the wireless frame in a broadcast period of system information modulo the repetition period of the MBSFN frames is the offset, otherwise, the mobile terminal determines the wireless frame as not the MBSFN frame.

2. The method according to claim 1, wherein
   the configuration parameters include configuration parameters of an MBSFN sub-frame, which occupy M bits, each bit correspondingly representing whether a sub-frame in the MBSFN frame is an MBSFN sub-frame, wherein M is the number of the sub-frames in the MBSFN frame.

3. A configuration method of Multicast/Broadcast over a Single Frequency Network (MBSFN) frames, applied in a Long Term Evolution (LTE) system, including:
   an access network sending configuration parameters of an MBSFN frame to a mobile terminal, and the mobile terminal determining whether a wireless frame received is the MBSFN frame according to the configuration parameters, and the configuration parameters including a repetition period of the MBSFN frames distributed in a system-set time,
wherein the configuration parameters further include a continuous distribution number and an offset of the MBSFN frames;
when determining whether the wireless frame received is the MBSFN frame, the mobile terminal determines the wireless frame received as the MBSFN frame if the remainder resulting from the sequence number of the wireless frame in a broadcast period of system information modulo the repetition period of the MBSFN frames is the sum of an arbitrary value in a range from 0 to the continuous distribution number of the MBSFN frames and the offset, otherwise, the mobile terminal determines the wireless frame as not the MBSFN frame.

4. The method according to claim 3, wherein the numbers of the bits occupied by the repetition period, the continuous distribution number and the offset of the MBSFN frames are all the value of $\log_2^k$, and K is the number of the wireless frames included in the broadcast period of the system information and has a value equal to an integral power of 2.

5. The method according to claim 3, wherein
the configuration parameters include configuration parameters of an MBSFN sub-frame, which occupy M bits, each bit correspondingly representing whether a sub-frame in the MBSFN frame is an MBSFN sub-frame, wherein M is the number of the sub-frames in the MBSFN frame.

6. A method for a mobile terminal to identify Multicast/Broadcast over a Single Frequency Network (MBSFN) frames, including:
the mobile terminal receiving configuration parameters sent by an access network for indicating whether a wireless frame is an MBSFN frame, and determining the wireless frame meeting the following formula as the MBSFN frame: SFN mod MBSFN_rep=MBSFN_offset;
wherein MBSFN_rep is the value of a repetition period included in the configuration parameters; MBSFN_offset is an offset read from the configuration parameters, or is set to be 0 if no offset information is contained in the configuration parameters; "SFN" is the sequence number of the wireless frame, and "mod" represents the modulo operation.

7. The method according to claim 6, wherein the access network takes the repetition period and the offset of the MBSFN frame as configuration parameters for indicating whether the wireless frame is the MBSFN frame; and
when sending the mobile terminal the configuration parameters for indicating whether the wireless frame is the MBSFN frame, the access network takes the repetition period as a necessary parameter and the offset as an optional parameter and only sends the optional parameter when the value of the optional parameter is not 0.

8. The method according to claim 6, wherein
the repetition period is smaller than or equal to a broadcast period of system information, and the configuration parameters of the repetition period and the offset are both represented by $\log_2^k$ bits, wherein K is the number of the wireless frames included in the broadcast period of the system information.

* * * * *

UNITED STATES PATENT AND TRADEMARK OFFICE
CERTIFICATE OF CORRECTION

PATENT NO. : 8,279,791 B2  
APPLICATION NO. : 12/937275  
DATED : October 2, 2012  
INVENTOR(S) : Ma et al.

Page 1 of 1

It is certified that error appears in the above-identified patent and that said Letters Patent is hereby corrected as shown below:

In the Specification

Column 6, line 19, the words "continuous distribution number MBSFN_length" should be changed to --arbitrary value in the range from 0 to MBSFN_length-1--.

Column 6, lines 48-49, the words "continuous distribution number MBSFN_length" should be changed to --arbitrary value in the range from 0 to MBSFN_length-1--.

Signed and Sealed this  
Fifteenth Day of October, 2013

Teresa Stanek Rea  
*Deputy Director of the United States Patent and Trademark Office*